(12) United States Patent
Reiss (10) Patent No.: US 8,079,284 B2
(45) Date of Patent: Dec. 20, 2011

(54) DEVICE FOR SWIVELING OBJECTS

(75) Inventor: Günther Reiss, Bad Homburg (DE)

(73) Assignee: ESAB Cutting Systems GmbH, Karben (DE)

( * ) Notice: Subject to any disclaimer, the term of this patent is extended or adjusted under 35 U.S.C. 154(b) by 995 days.

(21) Appl. No.: 11/989,705

(22) PCT Filed: Jul. 28, 2006

(86) PCT No.: PCT/DE2006/001318
§ 371 (c)(1),
(2), (4) Date: Jan. 30, 2008

(87) PCT Pub. No.: WO2007/025495
PCT Pub. Date: Mar. 8, 2007

(65) Prior Publication Data
US 2009/0145256 A1    Jun. 11, 2009

(30) Foreign Application Priority Data

Sep. 1, 2005    (DE) .......................... 10 2005 041 462

(51) Int. Cl.
*B25J 18/04*    (2006.01)
(52) U.S. Cl. .................... 74/490.05; 74/490.09; 901/15
(58) Field of Classification Search ................. 606/130; 74/490.01, 490.03, 490.04, 490.05, 490.06, 74/490.07, 490.09; 901/15, 19, 23
See application file for complete search history.

(56) References Cited

U.S. PATENT DOCUMENTS

| 4,543,033 A | 9/1985 | Czermak et al. |
| 4,551,058 A | 11/1985 | Mosher |
| 5,201,742 A | 4/1993 | Hasson |
| 5,640,883 A * | 6/1997 | Takizawa .................... 74/490.04 |
| 5,697,939 A | 12/1997 | Kubota et al. |
| 5,746,565 A * | 5/1998 | Tepolt .......................... 414/744.5 |

(Continued)

FOREIGN PATENT DOCUMENTS
DE    32 11 688    10/1983
(Continued)

OTHER PUBLICATIONS

International Search Report.
(Continued)

*Primary Examiner* — Richard W Ridley
*Assistant Examiner* — Terence Boes
(74) *Attorney, Agent, or Firm* — Collard & Roe, P.C.

(57) ABSTRACT

The invention relates to a device for swiveling an object around a stationary axis (16) which lies outside the space occupied by the device. The inventive device is characterized by unusually great rigidity. A supporting coupler (5) and a guiding coupler (10) are guided parallel to the frame (1) with the aid of cross-sliding elements. The supporting coupler (5) and the guiding coupler (10) are connected to a crank (4) by means of one respective revolute joint, the crank (4) guiding the supporting coupler (5) and the guiding coupler (10) along concentric, non-identical circular paths. The supporting coupler (5) and the guiding coupler (10) are provided with a second revolute joint located at the same distance from the first revolute joint, i.e. a revolute joint (5*b*) for the supporting coupler at the output end and a revolute joint (10*b*) for the guiding coupler at the output end, via which the two couplers (5, 10) are jointly connected to an output member (9). The tool is fixed to the output member (9), which follows a circular swiveling path about a stationary axis (16).

6 Claims, 8 Drawing Sheets

U.S. PATENT DOCUMENTS

| | | | |
|---|---|---|---|
| 7,175,635 B2 * | 2/2007 | Loser | 606/130 |
| 7,189,246 B2 * | 3/2007 | Otsuka et al. | 606/130 |
| 2004/0162564 A1 * | 8/2004 | Charles et al. | 606/130 |

FOREIGN PATENT DOCUMENTS

| | | |
|---|---|---|
| DE | 35 45 008 | 6/1987 |
| DE | 20 2004 017 526 | 5/2005 |
| EP | 0 556 499 | 8/1993 |
| EP | 0 291 292 | 11/1998 |
| FR | 2 460 762 | 1/1981 |
| JP | 2004-146714 | 5/2004 |
| WO | WO 03/086219 | 10/2003 |

OTHER PUBLICATIONS

Daniel C. H. Yang et al. "A New Zero-Dimension Robot Wrist: Design and Accessibility Analysis", The International Journal of Robotics Research, 2001, vol. 20, No. 2, pp. 163-173.

* cited by examiner

DEVICE FOR SWIVELING OBJECTS

CROSS REFERENCE TO RELATED APPLICATIONS

Applicant claims priority under 35 U.S.C. §119 of German Application No. 10 2005 041 462.1 filed Sep. 1, 2005. Applicant also claims priority under 35 U.S.C. §365 of PCT/DE2006/001318 filed Jul. 28, 2006. The international application under PCT article 21(2) was not published in English.

BACKGROUND OF THE INVENTION

1. Field of the Invention

The invention relates to a device for swiveling objects, whereby the objects can essentially be tools or also a camera, having a greater swiveling region than is usual in the case of conventional technical solutions.

2. The Prior Art

It is known that tool swiveling devices are used in many areas of technology. If these devices swivel the tool tip about a fixed point, the tool tip remains stationary in the case of a change in orientation, and this can be desirable for many different reasons. Typical applications are found in robotics, as a robot wrist. A robot wrist is a device for changing the orientation of the tool guided by the robot, e.g. a drill or a milling device. A change in orientation of the tool does not require a change in the spatial position of the wrist. An increase in the size of the robot work space, an improvement in the positioning accuracy, and the possibility of a very rapid change in orientation are positive results of such a principle of effect.

In this connection, one must not overlook the fact that sufficient rigidity is often absent because of a greater number of elements for transferring force and for guidance. Such devices are also frequently impaired in their function by dirt, dust, and possible chips. These problems occur also in the case of devices with which cleaning work is carried out, for example using nozzles.

The following technical solutions, in which objects are swiveled about a fixed point, can be mentioned to characterize the state of the art:

An assembly for guiding minimally invasive surgical instruments is described according to EP 0556499 A2. For this purpose, the surgical instrument is to be swiveled about the puncture point in the body, about two axes that stand vertically on one another. This is accomplished, in the present document, by means of disposing two parallel crank mechanisms one behind the other. A plurality of elements, which are connected with one another with rotary articulation, form the connection between the tool—here, the surgical instrument—and the frame. The mechanical rigidity of this assembly is, of course, slight, because of the long chain of elements between frame and tool, and furthermore, the plurality of joints bears in it the risk of play. The great number of gear mechanism elements requires very precise production of each individual one, in order to achieve the desired movement behavior.

U.S. Pat. No. 5,697,939 A describes a similar solution. This document, too, uses a parallel crank—referred to as a parallelogram mechanism—for guidance and, in particular, fixation of a surgical instrument. Here, however, only one parallel crank mechanism is used, and swiveling is implemented about the axis that lies at a right angle to the swiveling axis of the parallel crank, with a rotary joint that lies close to the frame.

A solution that should also be mentioned in this connection is indicated in accordance with WO 03/086219 A2.

The aforementioned disadvantages are reduced with the two last references named, under some circumstances, but they continue to exist in the same manner.

In U.S. Pat. No. 5,201,742 A, a device is presented that serves for precise orientation of a minimally invasive instrument, in such a manner that the orientation takes place about a fixed point, by means of circle arc guide, in the center of which the point of rotation of the instrument is situated, and on which the instrument can be manually swiveled and fixed in place when the desired position has been reached.

A technical solution for tracing is presented in accordance with DE 3545008 A1. An arc guide that comprises a quarter circle is connected with a rotary joint in such a manner that the axis of rotation and the center of the axis of rotation intersect, and a tool can be freely swiveled about this intersection point, in the region of a hemisphere.

All of the technical solutions having arc guides have specific disadvantages inherent in them. Arc guide elements are heavy, cost-intensive precision components, and they take up their entire movement range as a collision space. Of course, the movement range is limited.

A robot wrist for swiveling a tool about a fixed point is indicated in DE 3211688 A1, for which purpose a so-called double parallel guide is used. Again, comparatively many elements and joints are required. Low rigidity, particularly perpendicular to the movement plane of the parallelogram guide, is the result. The great number of rotary joints in the device makes its mobility without play more difficult. The movement range is limited to approximately 120°, because of the so-called dead points of the mechanism.

A further development of this principle is described in Yang, C. H., Rauchfuss, J. W.: A new Zero-Dimension Robot Wrist: Design and Accessibility Analysis, The International Journal of Robotics Research, Vol. 20, No. 2, February 2001, pp. 163-173. Two parallel crank mechanisms disposed on top of or inside one another eliminate the limitation of the swiveling range, and theoretically allow swiveling of the tool about 360°. However, all of the other disadvantages of parallel crank mechanisms remain.

SUMMARY OF THE INVENTION

Thus it is the task of the invention to propose a device for swiveling an object about a stationary axis, whereby the stationary axis is supposed to lie outside of the space taken up by the device, in the sense of a virtual axis. The drive of the device is supposed to take place exclusively with a (a single) rotational or also optionally a translational drive movement. Furthermore, it is the task of the invention to achieve unusually high rigidity of the device in the direction of the stationary axis, in that the path of the force flow is supposed to be configured so as to be short. The swiveling range of the object is supposed to amount to as much as 360°, so that the object can rotate about a virtual, stationary axis, without restrictions.

According to the invention, this task is accomplished by a device for swiveling objects, using a frame and two crosswise displacement elements, as well as two coupling elements, namely a support coupling and a guide coupling, which are two-dimensionally displaceable using the crosswise displacement elements, and furthermore a guide element that represents a crank in the kinematic sense, as well as a power take-off element, on which the object is disposed. The crank is mounted on the frame on one side, and the crank is connected with the support coupling on the other side, with rotary articulation. A rigid crank extension is disposed in the axial direction of the rotary-articulation connection of the crank with the support coupling, which extension is connected with a drive-side guide coupling rotary joint in such a manner that the crank moves the drive-side support coupling rotary joint and the drive-side guide coupling rotary joint along concentric circle tracks. Furthermore the support coupling and the guide coupling have a power-take-off-side support coupling rotary joint and a power-take-off-side guide coupling rotary joint, respectively, at the same distance from the drive-side support coupling rotary joint and the drive-side guide coupling rotary joint, respectively, in each instance. The power-take-off-side support coupling rotary joint and the power-take-off-side guide coupling rotary joint are rotatably connected with one another, with the power take-off element, which represents the tool holder, in such a manner that the tool holder is situated on the side of the support coupling that faces the frame, and a cantilevered journal that passes through the guide coupling is rigidly connected with a drive lever, which in turn is connected with the power-take-off-side guide coupling rotary joint.

The further embodiment of the invention is discussed below.

In order to explain the invention, additional statements will be made.

Two coupling elements, which carry the object to be swiveled, are guided on a frame, using known crosswise displacement elements. Because of the crosswise displacement elements, which are always situated first of all between the frame and the first coupling element, referred to as a support coupling, and furthermore between the support coupling and the second coupling element, referred to as a guide coupling, the coupling elements are guided parallel and at a constant distance from the frame. The crosswise displacement elements consist, in each instance, of two linear guides disposed on a cross plate, preferably at a right angle to one another. First of all, it should be stated that because of the two crosswise displacement elements, the support coupling and the guide coupling can be freely moved in two dimensions, with regard to the frame.

Now the directed movement of the coupling elements, which is necessary so that the task can be accomplished, namely that the object can be swiveled about a virtual, stationary axis outside of the device, is supposed to be presented.

The movement of the coupling elements is predetermined by a guide element that is a crank, viewed in kinematic terms. (For this reason, the term "crank" will also be used in the future.) The crank is mounted fixed to the frame on its one end, and is driven on the frame side, for example by means of an electric motor flanged onto the frame.

At its distal end, the crank carries a joint journal that forms one part of the support coupling rotary joint on the drive side, and connected the crank with the support coupling with rotary articulation. The joint journal as part of the support coupling rotary joint passes through the support coupling, and is rigidly connected with a crank extension at its end that faces away from the crank, which extension is connected, at its end, with the drive-side guide coupling rotary joint of the guide couple. As a result, the crank moves the drive-side support coupling rotary joint and the drive-side guide coupling rotary joint along concentric but not identical circle tracks.

Each coupling element possesses another rotary joint, at the same distance from the support coupling rotary joint and the guide coupling rotary joint, by way of which joint the coupling elements are connected, with one another, with a power take-off element. By means of the aforementioned assembly, this power take-off element describes circular swiveling about a virtual, stationary axis, which presents itself as an axis of rotation between frame and crank, displaced by the vector between the two rotary joints of the coupling elements.

The object to be swiveled, for example a tool, is attached to this power take-off element with a flange that can be configured in any desired manner, in such a manner that the tool tip, the so-called TCP (Tool Center Point), hits the virtual, stationary axis.

A variant of the device just described is characterized in that two guide elements, namely two cranks, are used.

Another solution of a holding device for tools in a machine tool is presented in JP 2004146714 A. One of three rotating shafts of the device stands in connection with a base element, whereby guide rails are also attached to the latter. In this regard, holding elements that can be moved along the rail are connected with the objects that change their place. Furthermore, couplings are connected with the other shafts, in each instance, whereby mechanisms that reverse movement are present to reverse the rotational movement of the couplings into linear movements of the objects to be moved. Thus, the rotational movements of the rotating shafts are converted into linear movements of the held elements, in each instance.

Swiveling movements of objects about stationary virtual axes are not possible with this solution.

A translation and swiveling device for moving and swiveling objects, particularly within a system for packaging parts, is known in accordance with DE 20 2004 017 526 U1. This device can also perform simple work within the production of components, in assembly line production.

The device allows two translational movement sequences, whereby a crank arm coupled with motor definition is affixed to a carrier unit that can be moved by itself. The arm can grasp objects by way of specific configurations, and bring about a change in location.

However, this solution cannot fulfill the requirements of the invention.

Accordingly, the frame is now structured to be so wide that a second crank, which precisely corresponds to the crank described previously, and is mounted horizontally at the same height on the frame, is driven synchronously with the crank already described. The agreement that exists as a result has an advantageous effect on the stability of the device. Further transfer of the movements takes place analogously as described above, except with the difference that the required components are provided twice on the drive side.

As an alternative solution according to the invention, it is proposed that the device consists only of a coupling element that is connected with the frame by way of a crosswise displacement element, in the manner already explained. This coupling element is connected with a rotary joint with a lever that in turn possesses a connection with the frame, with a rotary joint.

A second rotary joint on the coupling element serves as a mounting for the power take-off element, which in turn carries the flange for the tool.

A first cylindrical disk of a traction mechanism gear is disposed on the axis of the rotary joint that lies between lever and coupling element, in such a manner that the cylinder axis coincides with the axis of rotation. In the same manner, the power take-off element carries a second disk, which is identical with the first in its diameter. The two disks are connected by means of a traction mechanism, e.g. a toothed belt or a chain, and guarantee parallel guidance of the power take-off element relative to the drive coupling.

Some additional statements will be presented, relating to the further embodiment of the invention:

The frame and the coupling elements, which are guided at a constant distance from the frame and parallel to it, are preferably supposed to be configured in planar manner.

The crosswise displacement elements preferably consist of linear guides disposed at a right angle to one another and connected with a plate.

The angle formed by the axes of the first and second linear guide (on the frame side, on the support coupling side, on the guide coupling side), respectively, should be as large as possible (90°).

It should be pointed out that the second linear guide can also connect the guide coupling with the frame, instead of with the support coupling, in the manner described above.

It should furthermore be pointed out that not only one rail of the linear guide, but rather also two or more rails can be disposed parallel to one another, in order to increase the rigidity and for other design reasons.

The drive of the crank by way of pinion and drive gear wheel preferably takes place by way of a rotational drive, for practical purposes an electric drive. A translational drive would also be possible.

With regard to the drive, it should still be noted that it is advantageous if the drive occurs rotationally, at the crank connected with the frame so as to rotate. However, the drive can also take place between frame and the cross plate, between frame and first coupling element, or between the cross plate between frame and first coupling element, in the form of a translational drive. All of those embodiments in which the drive is configured fixed on the frame are advantageous.

The suggestions according to the invention make it possible to use only such machine elements that are suitable for use in a very dirty environment, by means of complete encapsulation.

The compact design, which takes place using standardized, cost-advantageous machine elements, should be emphasized as being particularly advantageous.

The invention will now be explained using three exemplary embodiments.

BRIEF DESCRIPTION OF THE DRAWINGS

The following figures show the swiveling device in a fundamental diagram.

DETAILED DESCRIPTION OF THE PREFERRED EMBODIMENTS

Figure 1:
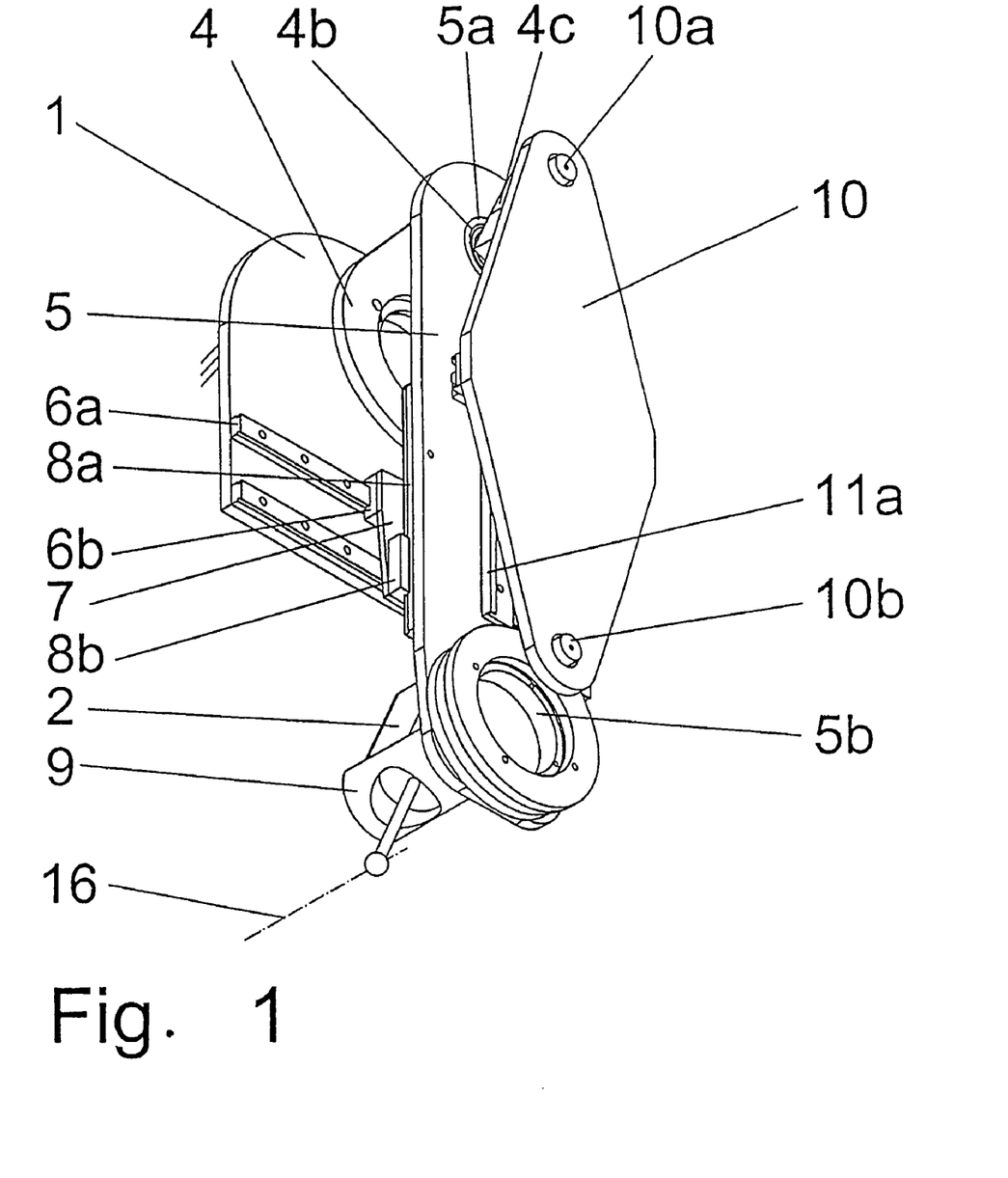
FIG. 1: perspective view from the left
Figure 2:
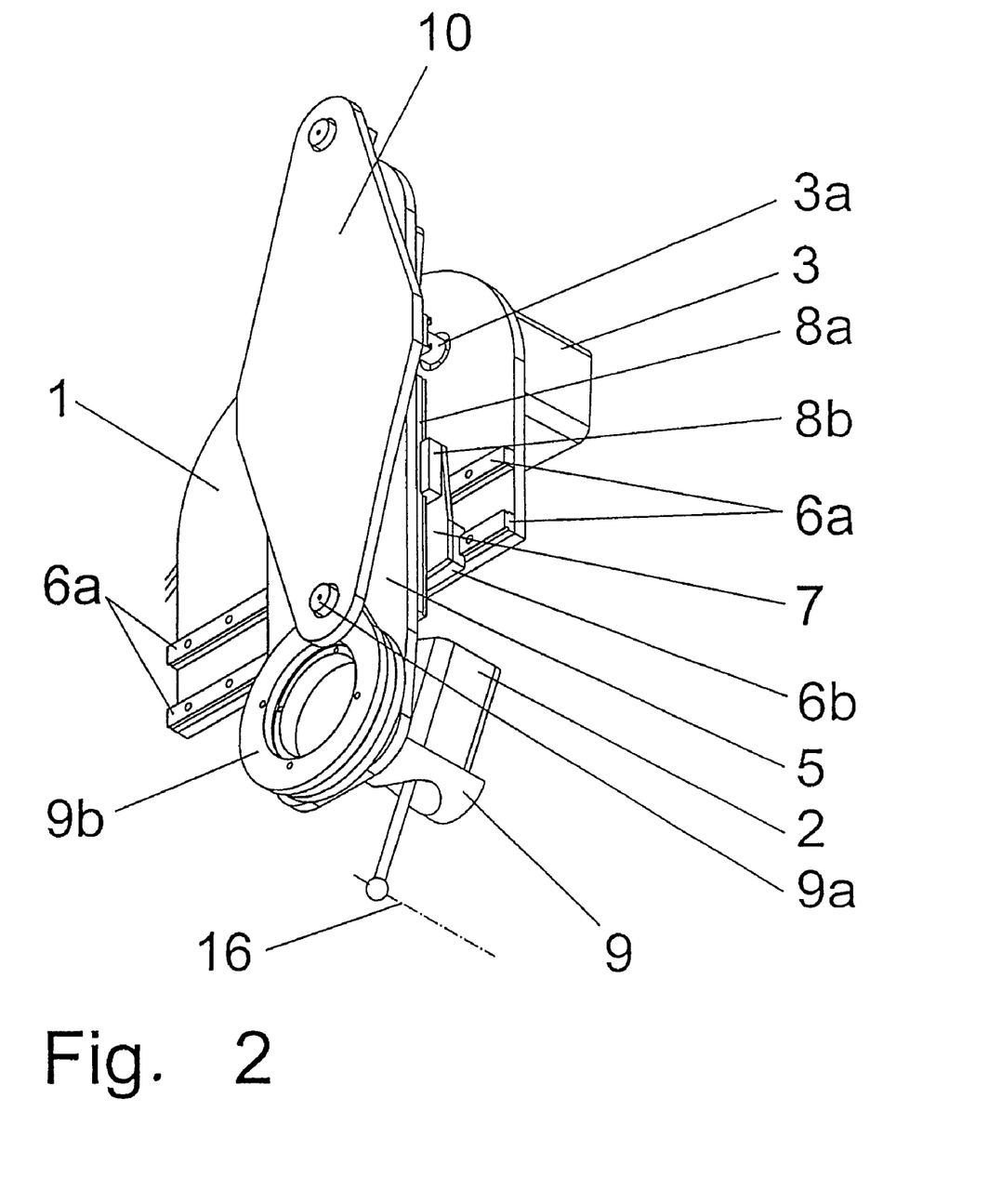
FIG. 2: perspective view from the right
Figure 3:
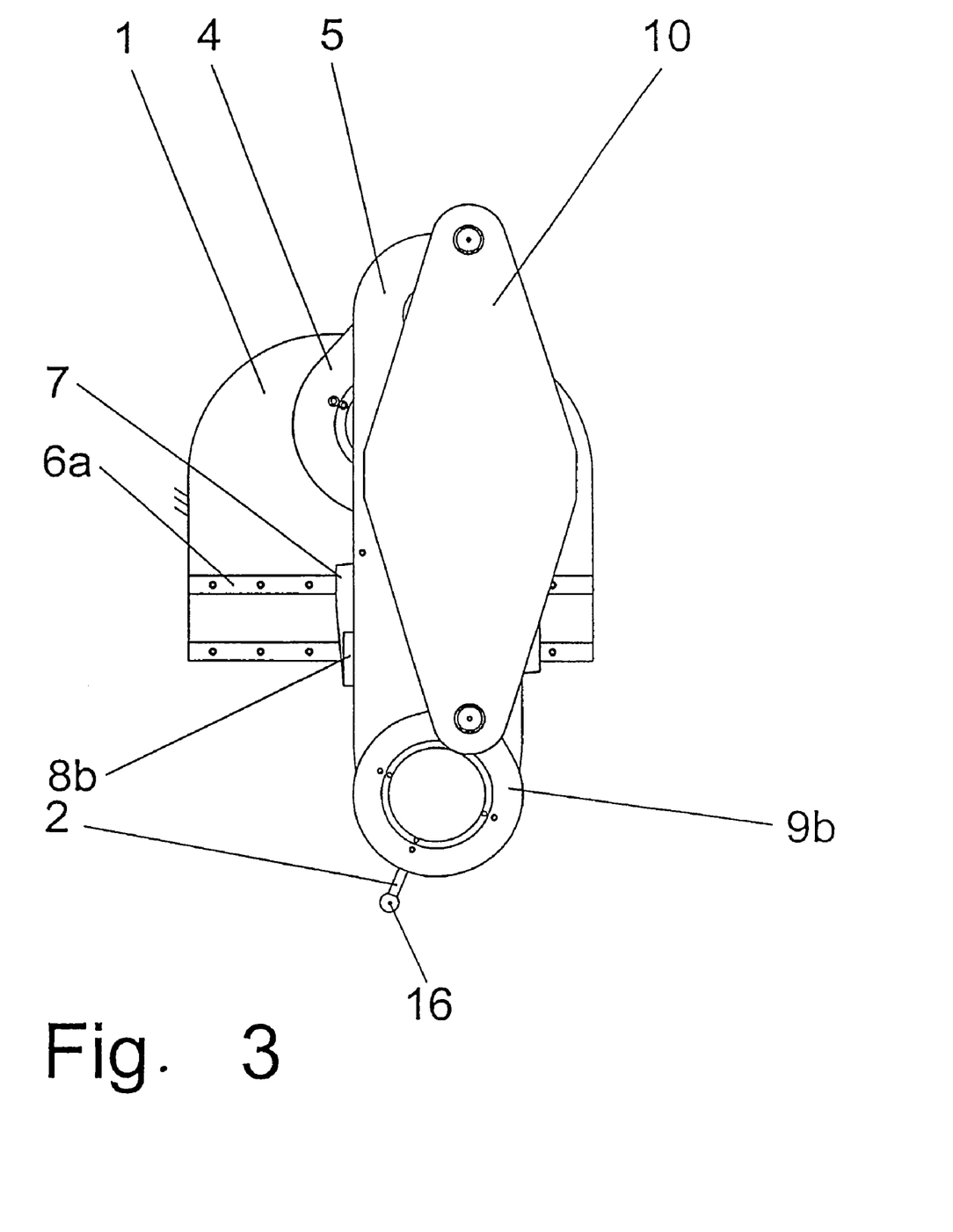
FIG. 3: front view
Figure 4:
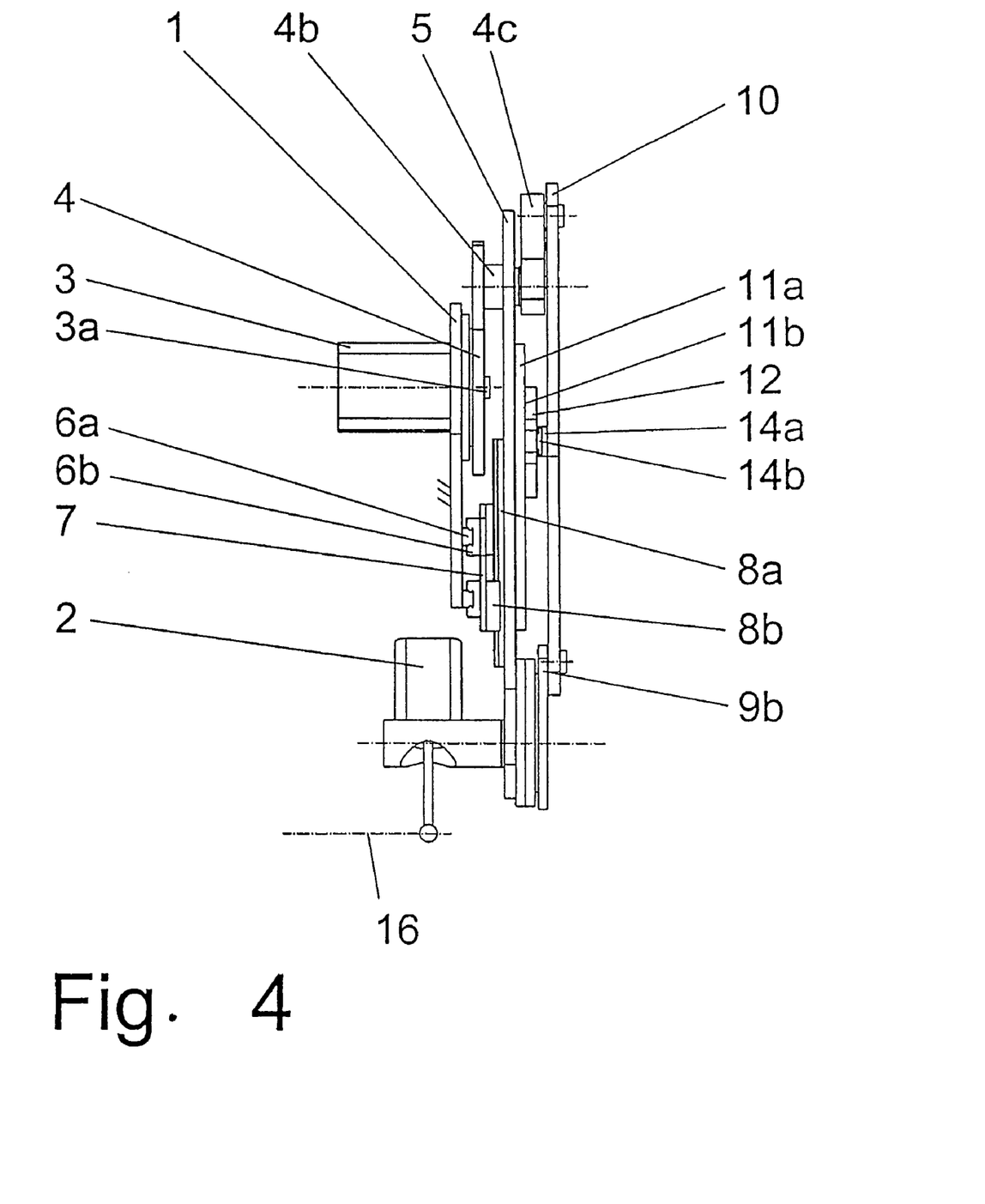
FIG. 4: side view
Figure 5:
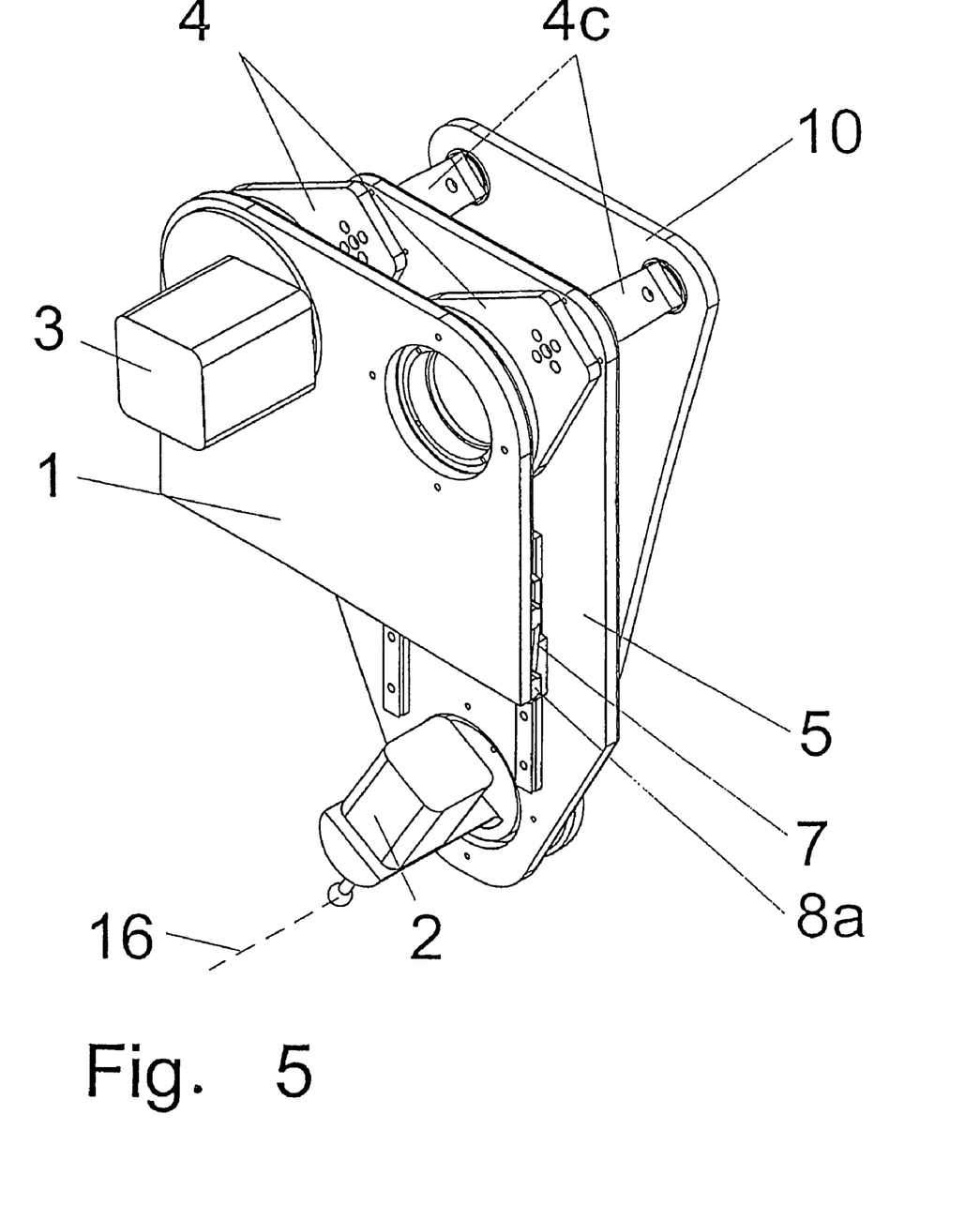
FIG. 5: perspective view with two cranks, whereby in the front, the frame can be seen
Figure 6:
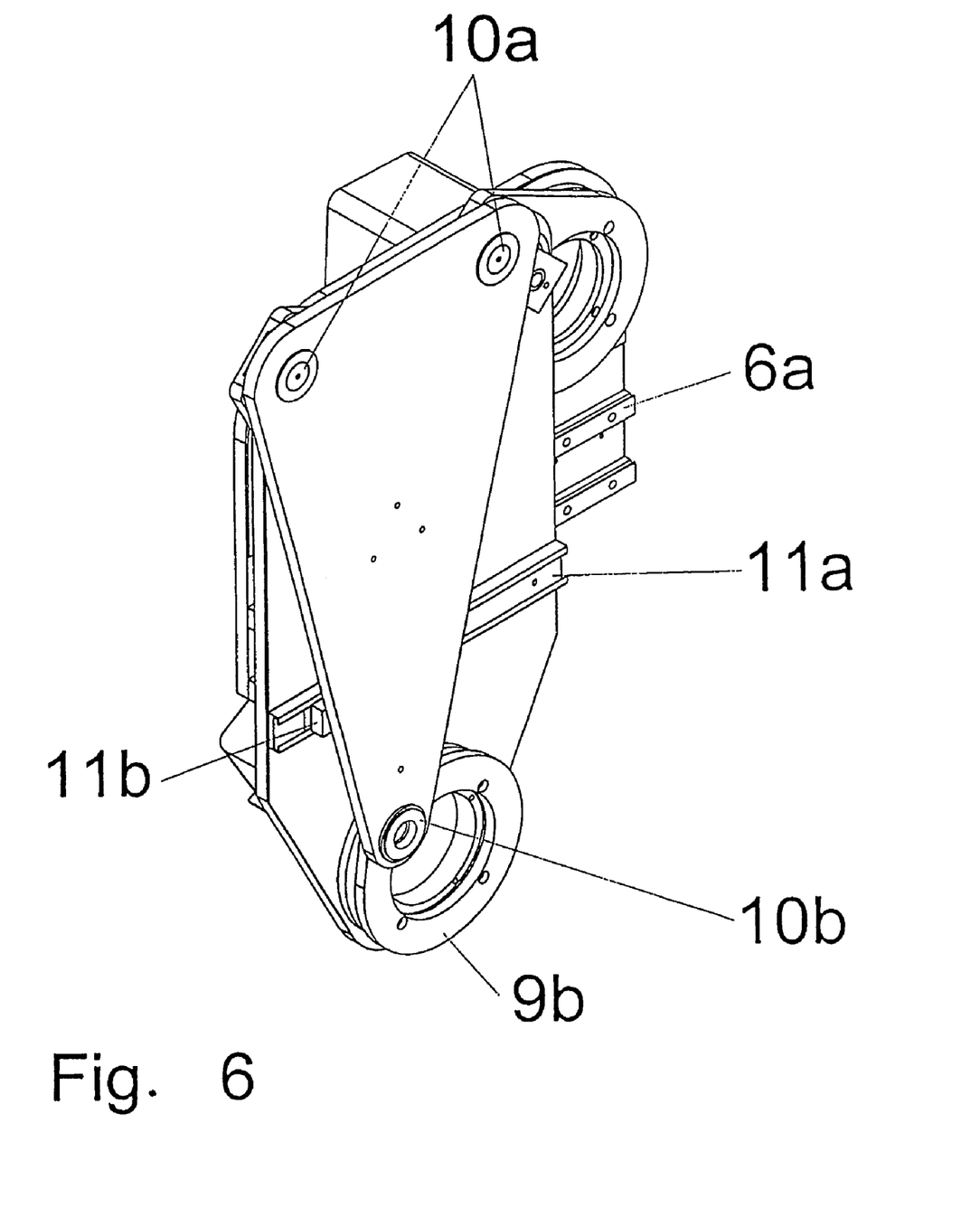
FIG. 6: perspective view with two cranks, whereby in the front, the guide connecting rod can be seen

As can be seen, some details were left out in FIGS. 5 and 6, in comparison with FIGS. 1 to 4, in order to avoid repetition.

With regard to the reference symbols used, see the list of reference symbols attached to the patent specification.

1<sup>st</sup> Exemplary Embodiment

See FIGS. 1-4.

Two coupling elements, i.e. the support coupling 5 and the guide coupling 10, are guided parallel and at a constant distance from the frame 1. The distance of the support coupling 5 from the frame 1 is less than the distance of the guide coupling 10. Two crosswise displacement elements, which consist of two linear guides, in each instance, disposed at a right angle to one another and connected with a plate, serve to guide the support coupling 5 and the guide coupling 10.

The first linear guide 6 *b* consists of the frame-side rails 6 *a* of the first linear guide 6 *b*, which are rigidly connected with the frame 1 and the frame-side carriage of the first linear guide 6 *b* that is movable on them in linear manner. The carriages of the first linear guide 6 *b* are connected with the first cross plate 7, with which the support-coupling-side carriages 8 *b* of the first linear guide 6 *b* are also connected, in turn. The support-coupling-side rails 8 *a* of the first linear guide 6 *b* that run into the support-coupling-side carriage 8 *b* of the first linear guide 6 *b* are connected with the support coupling 5.

Connecting the carriage with the first cross plate 7 takes place, in accordance with the exemplary embodiment, in such a manner that the angle enclosed by the axes of the frame-side rails 6 *a* of the first linear guide 6 *b* and the support-coupling-side rails 8 *a* of the first linear guide 6 *b* amounts to 90°. (An angle of 0° between the two axes is not permissible.)

The support coupling 5 and the guide coupling 10 are connected with the second linear guide in precisely identical manner. For this purpose, the support-coupling-side rail of the second linear guide 11*a* is connected with the support coupling 5. The support-coupling-side carriages of the second linear guide 1ib can move on it in linear manner, and are connected with the second cross plate 12. The guide-coupling-side carriages of the second linear guide 14*b*, in which the guide-coupling-side rail of the second linear guide 14*a* is movable in linear manner, and rigidly connected with the guide coupling 10, are also connected with the second cross plate 12.

Again, the angle enclosed by the axes of the support-coupling-side rail of the second linear guide 11*a* and the support-coupling-side rail of the second linear guide 14 *a* amounts to 90°.

The movement of the coupling elements is predetermined by the crank 4. The crank 4 is mounted fixed on the frame at its one end, and rigidly connected with a drive gear wheel. The drive gear wheel, and with it the crank 4, is moved by way of a rotational, preferably electric drive 3 with a drive pinion 3*a*. At its distal end, the crank 4 carries a joint journal 4 *b*, which forms part of the drive-side support coupling rotary joint 5*a* and connects the crank 4 with the support coupling 5 with a rotary articulation. The joint journal 4 *b* passes through the support coupling 5 and is rigidly connected with a crank extension 4 *c* at its end facing away from the crank 4, which extension is connected with the drive-side guide coupling rotary joint 10 *a* of the guide coupling 10 at its end.

With this, the crank 4 moves the drive-side support coupling rotary joint 5*a* and the drive-side guide coupling rotary joint 10 *a* along concentric, but not in identical circle tracks.

At its end facing away from the crank, the support coupling 5 carries another rotary joint, the power-take-off-side support coupling rotary joint 5 *b*. The same holds true for the guide coupling 10, which possesses the power-take-off-side guide coupling rotary joint 10 *b*. The distance between rotary joints in the plane of expanse of the guide coupling 10 and the support coupling 5 must be identical and greater than the distance between joints on the crank extension 4 *c*.

The support coupling is rotatably connected with the power take-off element 9, which is identical with the tool holder, with the power-take-off-side support coupling rotary joint 5 *b*, in such a manner that the tool holder is situated on the side of the support coupling 5 that faces the frame 1. A cantilevered journal 9 *a* that passes through the support coupling 5 is rigidly connected with a power take-off lever 9 *b*, which in turn is connected with the power-take-off-side guide coupling rotary joint 10 *b*.

The power take-off element 9 describes a circular swiveling movement about the stationary axis 16.

In order to make the device able to function, the distance between joints of the crank extension 4 *c* and on the drive lever 9 *b* must be the same.

It should be pointed out that all of the rotational movements take place in parallel planes.

2nd Exemplary Embodiment

See FIGS. 5 and 6.

The fundamental solution is shown when two cranks 4 are used. The movement sequence and force flow correspond to the 1st exemplary embodiment.

3rd Exemplary Embodiment

Figure 7:
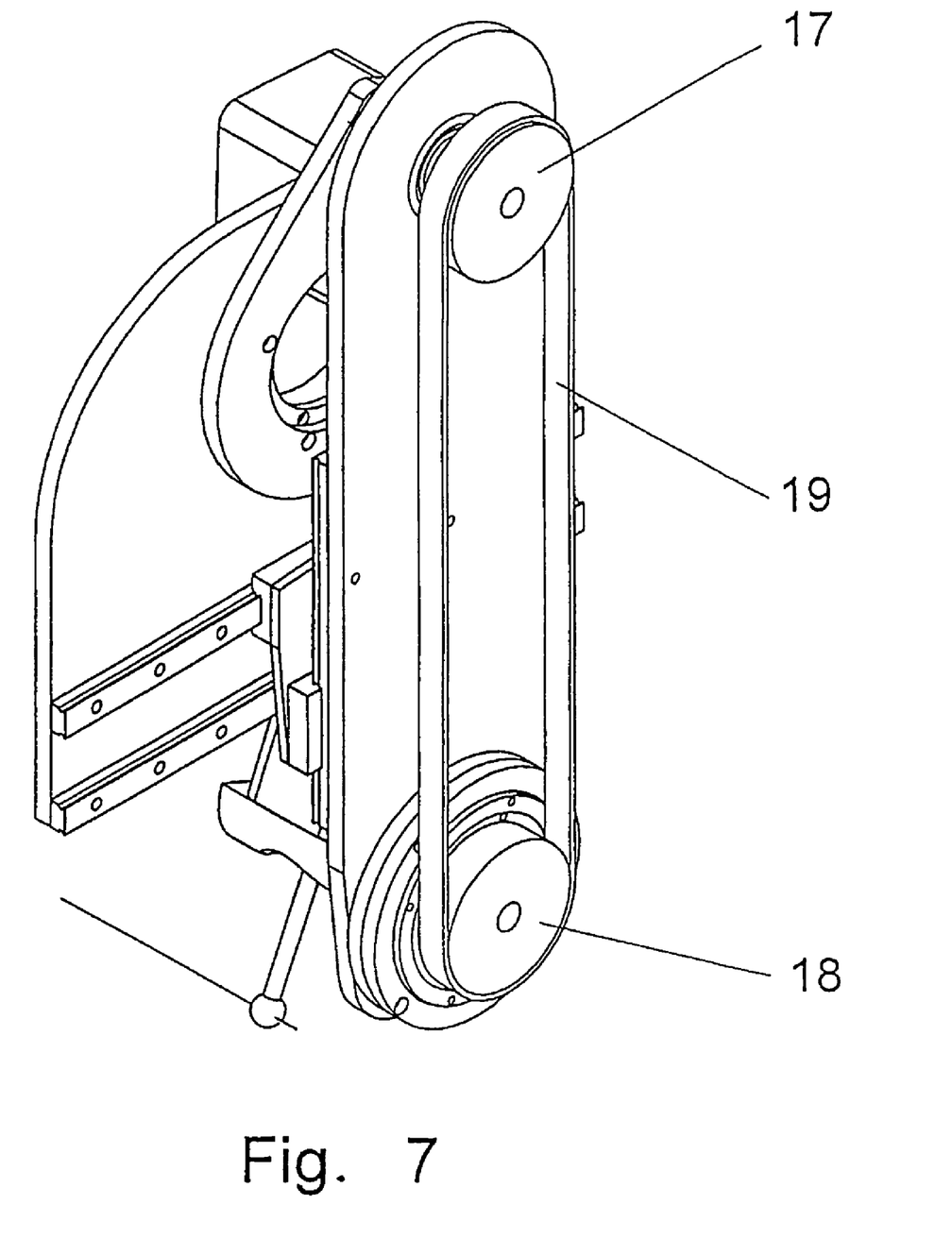
FIG. 7: perspective view from the left, with traction mechanism gear
Figure 8:
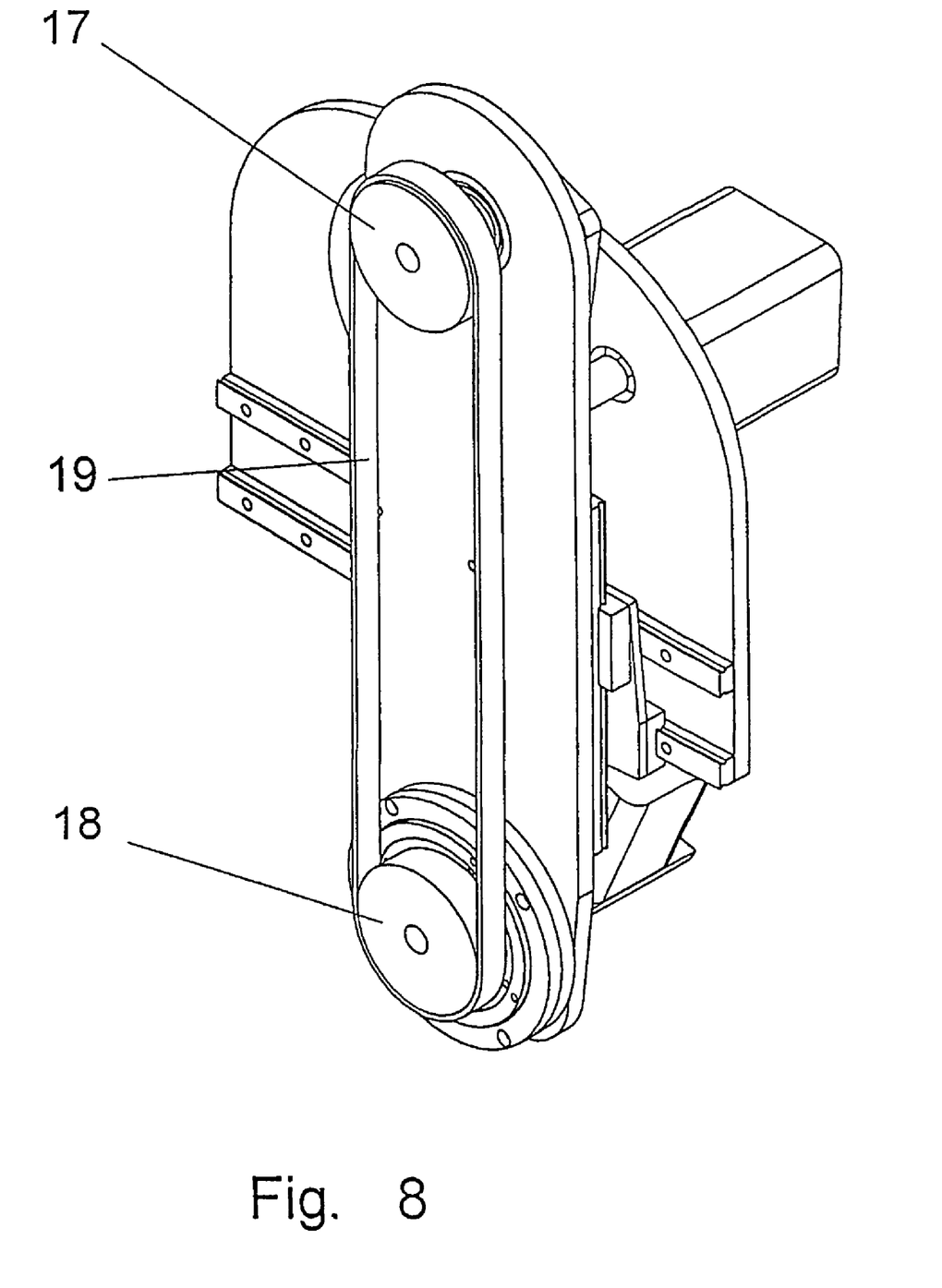
FIG. 8: perspective view from the right, with traction mechanism gear

See FIGS. 7 and 8.

Exemplary embodiment 3 shows a fundamental solution when using a traction mechanism gear, for example a toothed belt or a chain. For this purpose, in contrast to the exemplary embodiment 1, the drive-side tension mechanism gear wheel 17 is attached to the joint journal 4 *b* in place of the crank extension 4 *c*. The power-take-off-side traction mechanism gear wheel 18 is affixed to the power-take-off-side support coupling rotary joint 5 *b* in place of the power take-off lever 9 *b*. The traction mechanism gear wheels 17 and 18 possess identical diameters. The two traction mechanism gear wheels 17 and 18 are connected by way of a traction mechanism 19.

LIST OF REFERENCE SYMBOLS USED

1—frame
2—tool
3—drive
3*a*—drive pinion
4—crank
4*b*—joint journal
4*c*—crank extension
5—support coupling
5*a*—support coupling rotary joint on the drive side
5*b*—support coupling rotary joint on the power take-off side
6*a*—rail on the frame side
6*b*—first linear guide
7—first cross plate
8*a*—rail on the support coupling side
8*b*—carriage on the support coupling side
9—power take-off element
9*a*—cantilever journal
9*b*—power take-off lever
10—guide coupling
10*a*—guide coupling rotary joint on the drive side
10*b*—guide coupling rotary joint on the power take-off side
11*a*—rail of the 2nd linear guide on the support coupling side
11*b*—carriage of the 2nd linear guide on the support coupling side
12—second cross plate
14*a*—rail of the 2nd linear guide on the guide coupling side
14*b*—carriage of the 2nd linear guide on the guide coupling side
16—stationary axis
17—traction mechanism gear wheel on the drive side
18—traction mechanism gear wheel on the power take-off side
19—traction mechanism

The invention claimed is:

1. A device for swiveling an object comprising:
(a) a frame;
(b) first and second crosswise displacement elements;
(c) a support coupling element and a guide coupling element, said support coupling element and said guide coupling element being two-dimensionally displaceable via the first and second crosswise displacement elements, said support coupling element comprising a drive-side support coupling rotary joint and a power-take-off side support coupling rotary joint, said drive-side support coupling rotary joint comprising a joint journal, said guide coupling element comprising a drive-side guide coupling rotary joint and a power-take-off-side guide coupling rotary joint;
(d) a guide element comprising a first crank having first and second sides;
(e) a power take-off element for holding the object;
(f) a rigid crank extension;
(g) a cantilevered journal;
(h) a power-take off lever; and
(i) a driving element;
wherein the first crank is mounted on the frame on the first side and connected with the support coupling on the second side by the joint journal with rotary articulation,
wherein the rigid crank extension is arranged axially to the joint journal and between the support coupling element and the guide coupling element, said rigid crank extension being connected with the drive-side guide coupling rotary joint in such a manner that the first crank moves the drive-side support coupling rotary joint and the drive-side guide coupling rotary joint along concentric circle tracks,
wherein a first distance between the power-take-off-side support coupling rotary joint and the drive-side support coupling rotary joint is identical to a second distance between the power-take-off-side guide coupling rotary joint and the drive-side guide coupling rotary joint,
wherein the power-take-off-side support coupling rotary joint and the power-take-off-side guide coupling rotary joint are rotatably connected with one another to the power take-off element in such a manner that the power take-off element is situated on a side of the support coupling element that faces the frame, and the cantilevered journal passes through the guide coupling element and is rigidly connected with the power-take off lever, said power-take off lever in turn being connected with the power-take-off-side guide coupling rotary joint.

2. The device according to claim 1, wherein the support coupling element comprises a traction mechanism gear for parallel motion of the power take-off element and the joint journal.

3. The device according to claim 1, wherein the support coupling element and the guide coupling element have a flat shape.

4. The device according to claim 1, wherein the first and second crosswise displacement elements comprise linear guides disposed at right angles to one another.

5. the device according to claim 1, wherein the driving element imports a rotational drive movement to the guide element.

6. The device according to claim 1, further comprising a second crank, a second joint journal, a second rigid crank extension, a second drive-side support coupling rotary joint, and a second drive-side guide coupling rotary joint,
   wherein said second crank is placed on a side of the frame facing the support coupling element, adjacent to the first crank, said second crank having a second height identical to a first height of the first crank,
   wherein said second crank moves synchronously with the first crank.

* * * * *